June 19, 1956 — W. I. MAKI — 2,750,864
VENTILATOR FOR VEHICLE BODY
Filed Sept. 11, 1953
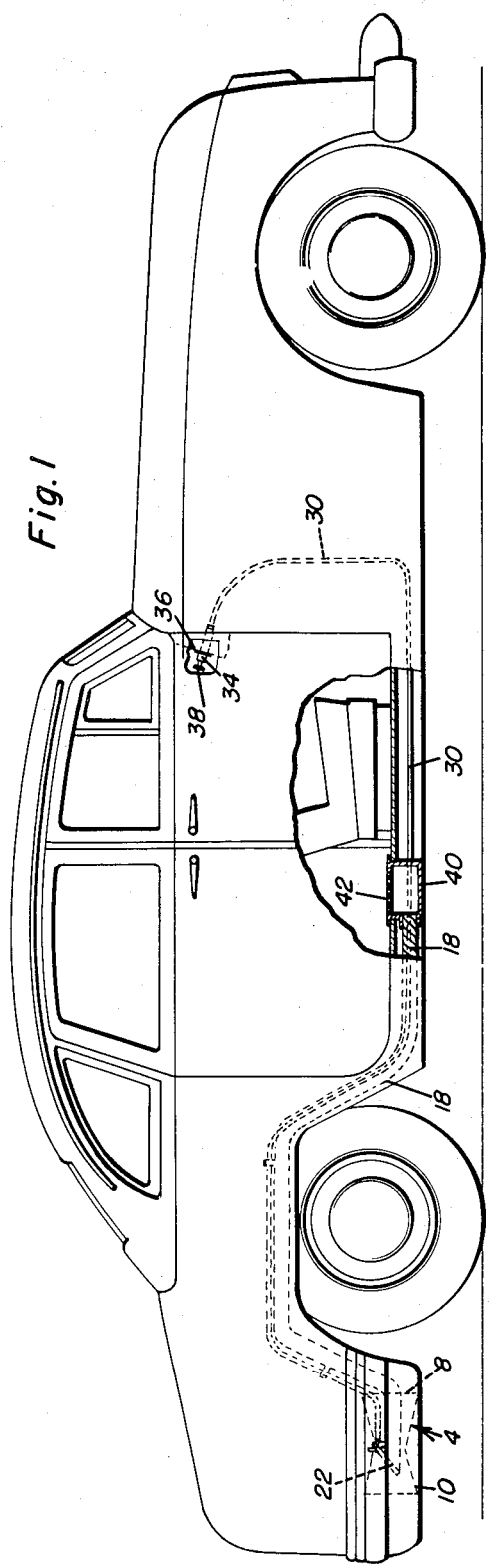
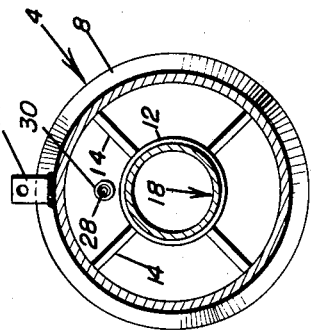
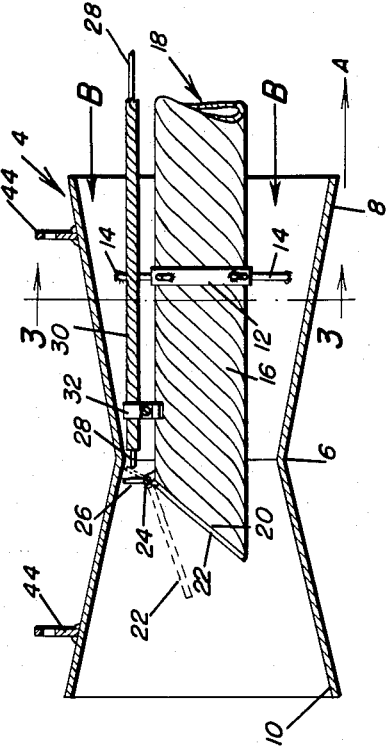
Wilho I. Maki
INVENTOR.

United States Patent Office 2,750,864
Patented June 19, 1956

2,750,864

VENTILATOR FOR VEHICLE BODY

Wilho I. Maki, Hibbing, Minn.

Application September 11, 1953, Serial No. 379,537

3 Claims. (Cl. 98—2)

The present invention relates to certain new and useful improvements in a ventilating structure for the tonneau or interior of vehicles, automobiles and buses for example, and the obvious object of the invention is to satisfactorily ventilate the stated interior without opening the windows, thereby eliminating objectionable drafts and wind-howling caused by window vents now currently in use.

Another object of the invention is to structurally, functionally and otherwise improve upon similarly constructed and performing so-called car ventilating systems and, in doing so, to provide a highly simple, practical and efficient ventilating means in which manufacturers, users and others will find their respective requirements and needs satisfactorily met.

Briefly summarized, a preferred embodiment of the invention, the one herein disclosed, is characterized by a conduit having air intake means at one end, a funnel having a venturi restriction, the discharge end of said conduit extending axially into one end portion of said funnel, a normally closed valve closing said discharge end, and remote-controlled means for closing and holding said valve closed whenever necessary or desired.

Another feature of construction exemplified herein, and constituting a worthy improvement has to do with the aforementioned structural arrangement wherein the discharge end of said conduit extends telescopically into the leading or air inlet end of said funnel and terminates rearwardly of the venturi restriction and forwardly of the outlet end or the trailing end of said funnel.

Then, too, novelty is predicated on a simple flap valve which is pivotally mounted on the discharge end of said conduit, said valve being gravity-closed and therefore constituting a self-closing valve, said valve serving to guard against undesirable back draft and providing, as is evident, a significant improvement in the over-all construction.

What is more, the invention features a remote-controlled push-pull flexible shaft which may be operated from the instrument panel by suitable means, the other end of said shaft being so constructed and arranged that it can close, but not open, the aforementioned self-closing anti-back draft valve.

Other objects, features and advantages will become more readily apparent from the following description and the accompanying sheet of illustrative drawings.

In the drawings, wherein like numerals are employed to designate like parts throughout the views, and in which:

Figure 1 is a side elevational view of an automobile with portions broken away and appearing in sections and with the major portions of the apparatus or device shown in phantom lines;

Figure 2 is an enlarged view in section and elevation showing the essential features in the over-all construction; and, Figure 3 is a section on the vertical line 3—3 of Figure 2, looking in the direction of the arrows.

By way of introduction to the details, the description is to be explained as the device or apparatus is primarily mounted on the exterior of the vehicle body as shown in Figure 1. The mode of mounting is of secondary importance and it is the construction and arrangement of parts which is, obviously, the principal subject matter herein under consideration. Reference is had therefore to Figure 2, wherein the numeral 4 designates a funnel, sometimes referred to as a dual funnel in that it has a central venturi restriction 6 defining a forwardly flaring leading and air intake end 8 and a correspondingly flaring air outlet or trailing end 10. Fixedly mounted in the end section 8 is a spider comprising a ring 12 with radial spokes 14 secured to the interior surfaces of said section midway between the respective ends of said section 8. This spider serves to support the rearward end portion 16 of the conduit or duct 18. The latter may be a rigid pipe or tube, but for the most part it will be flexible, in the manner shown. The rear end of said conduit passes through the spider ring and has an oblique rearwardly and downwardly inclined terminal 20 which projects to the left, in the drawings, of the venturi restriction 6. It terminates however within limits of the rear section 10. The gravity-closed or self-closing flap or plate valve 22 normally closes said terminal or discharge end. It has pivotal connection and mounting at 24 so that it may swing to open position as shown in dotted lines. The upper pivoted end is also provided with a suitably angled tappet or closing finger 26 with which the adjacent disconnected and projected end of the push-pull flexible shaft 28 cooperates, in an obvious manner. The shaft is mounted in a suitable housing or casing as at 30 and the latter is supported on appropriate brackets or fixtures 32 mounted on the conduit or elsewhere. This arrangement preferably includes a cylinder or the like 34 on the instrument panel 36 having a control knob 38 connected with the push-pull shaft. As stated, the valve is self-closing. The dash control means for the flexible remotely-controlled push-pull shaft can close, but not open, the self-actuating, anti-back draft valve. The intake end of the conduit of course communicates with the interior of the automobile or other vehicle. Generally, a small box or the like 40 is built into the floor or elsewhere and this is provided with a grill or register 42, making it possible to ventilate the car without opening the windows in the manner already described. The arrow A in Figure 2 indicates the direction of movement of the vehicle and the arrows B indicate the direction in which the atmospheric air, under pressure when the car is in motion, enters the leading end section 8, where it cooperates with the venturi restriction, and creates the desired vacuum on the discharge end of the conduit, thus pulling the air out of the interior of the car and discharging it in an obvious manner. The brackets 44 on the funnel serve to hang or otherwise mount the funnel at the desired place, as shown for example in dotted lines in Figure 1.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In a ventilating device for a vehicle body, an open-ended funnel having means whereby it may be fixedly attached to a predetermined portion of a vehicle body, said funnel having a central venturi restriction and a forwardly flaring leading and air intake end, and a rearwardly flaring air discharge end, said funnel being positioned, when in use, outside of the vehicle in air moving relative to the vehicle, a spider embodying a ring and radial spokes, said spider being mounted in said leading end, a ventilating conduit having an air discharge end portion supported in said ring and projecting into said funnel and having an oblique downwardly and rearwardly inclined terminal end projecting rearwardly of the venturi restriction and terminating within the limits of said rearwardly flaring end, the air intake end of said conduit being, when in use, in fluid communication with the interior of said vehicle body, and valve means operatively mounted on said terminal end, said valve means comprising a gravity-closed plate pivotally mounted on said terminal end and provided at its pivoted end with an actuating finger, and a flexible push-pull shaft slidably and operatively mounted on said conduit and having an end portion in alignment with and spaced from and thus operatively cooperable with said finger.

2. Means for ventilating the tonneau of a vehicle body comprising a conduit having air intake means at one end, a funnel having a venturi restriction, the discharge end of said conduit extending axially into one end portion of said funnel, said discharge end projecting telescopically into and rearwardly beyond the venturi restriction and having a rearwardly and downwardly inclined terminal, the discharge end of said conduit and said funnel being positioned, when in use, outside of the vehicle body in air moving relative to said body, and the air intake end of said conduit being positioned, when in use, in fluid communication with the tonneau of said vehicle body, a correspondingly inclined flap valve pivoted on said discharge end, said valve being self-closing and normally closed, and remote-controlled means for closing said valve from an opened position, said remote-controlled means comprising a flexible push-pull shaft and a casing therefor, one end of said shaft being provided with an operating member adapted to be supported within convenient reach on the instrument panel of the vehicle, the other end of said shaft being disposed in close proximity to the pivoted end portion of said valve, the marginal portion of said valve having an outstanding rigid closing finger and said other end of said shaft being aligned with and adapted to come into end-thrust contact with said finger and, alternatively, to be retracted to a position away from the finger to allow the valve to swing upwardly to open position.

3. In a ventilating device for a vehicle body, an open-ended funnel having means whereby it may be fixedly attached to a predetermined portion of a vehicle body, said funnel having a central venturi restriction, a forwardly flaring leading and air intake end, and a rearwardly flaring air discharge end, said funnel being positioned, when in use, outside of the vehicle in air moving relative to the vehicle, a spider embodying a ring and radial spokes, said spider being mounted in said leading section, a ventilating conduit having an end portion supported in said ring and projecting into said funnel and having an oblique downwardly and rearwardly inclined terminal end projecting rearwardly of the venturi restriction and terminating midway between the ends of said rearwardly flaring discharge end, the intake end of said conduit being, when in use, in fluid communication with the interior of the body of said vehicle, a correspondingly inclined flap valve pivoted on the upper portion of said terminal end, said valve being gravity operable, self-closing and normally closed and the pivoted end thereof being provided with an upstanding rigid closing finger, and remote control means for returning said valve to its closed position from an opened position by way of said finger.

References Cited in the file of this patent

UNITED STATES PATENTS

| | | |
|---|---|---|
| 26,967 | Colhoun | Jan. 31, 1860 |
| 171,611 | Godley | Dec. 28, 1875 |
| 290,710 | Scott | Dec. 25, 1883 |
| 832,329 | Mandeville et al. | Oct. 2, 1906 |
| 2,089,496 | Liber | Aug. 10, 1937 |
| 2,112,101 | Kliesrath | Mar. 22, 1938 |
| 2,117,963 | Kalbreier | May 17, 1938 |
| 2,631,518 | Brandenburg | Mar. 17, 1953 |

FOREIGN PATENTS

| | | |
|---|---|---|
| 852,716 | France | Mar. 1, 1940 |